US012505254B2

(12) United States Patent
Wen

(10) Patent No.: US 12,505,254 B2
(45) Date of Patent: Dec. 23, 2025

(54) DATA PROCESSING METHOD AND APPARATUS BASED ON BLOCKCHAIN NETWORK, AND COMPUTER DEVICE

(71) Applicant: TENCENT TECHNOLOGY (SHENZHEN) COMPANY LIMITED, Shenzhen (CN)

(72) Inventor: Weili Wen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 546 days.

(21) Appl. No.: 17/968,450

(22) Filed: Oct. 18, 2022

(65) Prior Publication Data
US 2023/0037932 A1 Feb. 9, 2023

Related U.S. Application Data

(63) Continuation of application No. PCT/CN2022/073412, filed on Jan. 24, 2022.

(30) Foreign Application Priority Data

Feb. 7, 2021 (CN) .......................... 202110175960.1

(51) Int. Cl.
G06F 21/64 (2013.01)
G06Q 20/40 (2012.01)
H04L 9/08 (2006.01)

(52) U.S. Cl.
CPC ........... *G06F 21/64* (2013.01); *G06Q 20/401* (2013.01); *H04L 9/0825* (2013.01)

(58) Field of Classification Search
CPC ........ G06F 21/64; G06F 21/602; G06F 16/27; G06F 21/62; G06Q 20/401; G06Q 20/02;
(Continued)

(56) References Cited

U.S. PATENT DOCUMENTS 10,652,019 B1 * 5/2020 Nicolas ................. H04L 9/3239
10,722,649 B2 * 7/2020 Tang .................... G06F 16/2379
(Continued)

FOREIGN PATENT DOCUMENTS

CN 107908979 A 4/2018
CN 109493204 A 3/2019
(Continued)

OTHER PUBLICATIONS

The European Patent Office (EPO) The Extended European Search Report for 22748916.Mar. 8, 25, 2024 8 Pages.
(Continued)

*Primary Examiner* — Sargon N Nano
(74) *Attorney, Agent, or Firm* — Anova Law Group, PLLC

(57) ABSTRACT

A data processing method and apparatus based on a blockchain network, and a computer device. The method includes acquiring a transaction request, the transaction request carrying transaction data and reference signature data corresponding to the transaction data; validating the transaction data and the reference signature data; determining a matching node device from a target node device if the transaction data and the reference signature data are validated, and acquiring a signing key of the matching node device; determining data to be signed according to the transaction data, and signing on the data to be signed using the signing key of the matching node device to obtain endorsement signature data; and transmitting the endorsement signature data to the management device, wherein the management device generates a transaction block according to the endorsement signature data and the transaction data.

12 Claims, 4 Drawing Sheets

(58) Field of Classification Search
CPC ........... G06Q 20/0655; G06Q 20/3825; G06Q 20/3829; G06Q 20/405; G06Q 20/3929; H04L 9/0825; H04L 67/306; H04L 9/32; H04L 67/1097; H04L 67/2809
USPC .......................................................... 713/176
See application file for complete search history.

(56) References Cited

U.S. PATENT DOCUMENTS

| | | | | |
|---|---|---|---|---|
| 11,023,309 | B2* | 6/2021 | Deng | H03M 13/154 |
| 11,792,006 | B2* | 10/2023 | Guo | H04L 9/3239 |
| | | | | 713/168 |
| 12,192,387 | B2* | 1/2025 | Sethi | H04L 9/50 |
| 2020/0007314 | A1* | 1/2020 | Vouk | H04L 9/0643 |
| 2020/0013025 | A1* | 1/2020 | Verma | H04L 9/3297 |
| 2020/0092082 | A1* | 3/2020 | Raman | H04L 9/3236 |
| 2020/0151682 | A1* | 5/2020 | Hurry | H04L 9/0637 |
| 2020/0186369 | A1 | 6/2020 | Yoshihama et al. | |
| 2021/0097528 | A1* | 4/2021 | Wang | H04L 9/30 |
| 2021/0119781 | A1* | 4/2021 | Liu | H04L 9/085 |
| 2021/0119807 | A1* | 4/2021 | Chen | H04L 9/3242 |
| 2021/0174359 | A1* | 6/2021 | Lin | H04L 9/0643 |
| 2021/0256010 | A1* | 8/2021 | Sinclair | G06F 16/2379 |
| 2022/0094555 | A1* | 3/2022 | Roy | G06Q 20/065 |
| 2022/0237181 | A1* | 7/2022 | Liu | G06F 21/64 |

FOREIGN PATENT DOCUMENTS

| | | | |
|---|---|---|---|
| CN | 110572398 | A | 12/2019 |
| CN | 112053153 | A | 12/2020 |
| CN | 112527912 | A | 3/2021 |

OTHER PUBLICATIONS

The World Intellectual Property Organization (WIPO) International Search Report for PCT/CN2022/073412 Apr. 20, 2022 7 Pages (including translation).

* cited by examiner

DATA PROCESSING METHOD AND APPARATUS BASED ON BLOCKCHAIN NETWORK, AND COMPUTER DEVICE

RELATED APPLICATIONS

This application is a continuation of PCT Application No. PCT/CN2022/073412, filed on Jan. 24, 2022, which in turn claims priority to Chinese Patent Application No. 202110175960.1, entitled "DATA PROCESSING METHOD AND APPARATUS BASED ON BLOCK-CHAIN NETWORK, AND COMPUTER DEVICE", and filed with the Chinese Patent Office on Feb. 7, 2021. The two applications are incorporated herein by reference in their entirety.

FIELD OF THE TECHNOLOGY

This application relates to the technical field of blockchains, in particular, to a data processing technology in a blockchain network.

BACKGROUND OF THE DISCLOSURE

With the advent of the era of science and technology and the development of the mobile Internet, networks change at an increasing pace. Information fusion of one field or multiple fields, and services for providing an all-round informatization solution for users also face new challenges such as improvement of a system structure and transferring of a supporting center of gravity. As a specific implementation technology of distributed ledgers, a blockchain technology has gradually become the technology of choice for data storage and data transaction in various fields by virtue of its advantages in storing and managing data.

A transaction process implemented based on a blockchain network has a great impact on the transaction performance. Usually, each transaction in the blockchain network can only be executed or uploaded by each node after completing the consensus processing. In order to ensure the accuracy of a consensus result, most nodes in the blockchain network are usually set as consensus nodes, and all nodes need to participate in each consensus process. As a result, the consensus process takes a long time, and the transaction performance is less efficient. To improve the transaction performance of the blockchain network is a problem to be solved.

SUMMARY

Embodiments of this application provide a data processing method and apparatus based on a blockchain network, and a computer device, which can effectively save the time for consensus processing, thus improving the transaction performance of the entire blockchain network.

One aspect of this application provides a data processing method based on a blockchain network, the blockchain network being in a data processing network, the blockchain network including a plurality of node devices, the data processing network further including a management network, the management network including a management device and one or more endorsement devices. The method, implemented by each endorsement device in the management network, includes acquiring a transaction request, the transaction request carrying transaction data and reference signature data corresponding to the transaction data; validating the transaction data and the reference signature data; determining a matching node device from a target node device in a case that the transaction data and the reference signature data are validated, and acquiring a signing key of the matching node device, the target node device being identified from a plurality of node devices in the blockchain network according to an instruction of an endorsement policy; determining data to be signed according to the transaction data, and signing on the data to be signed using the signing key of the matching node device to obtain endorsement signature data; and transmitting the endorsement signature data to the management device, wherein the management device generates a transaction block according to the endorsement signature data and the transaction data.

A second aspect of this application provides another data processing method based on a blockchain network, the blockchain network being in a data processing network, the blockchain network including a plurality of node devices, the data processing network further including a management network, the management network including a management device and one or more endorsement devices. The method, implemented by the management device in the management network, includes acquiring a transaction request, the transaction request carrying transaction data and reference signature data corresponding to the transaction data; determining a target endorsement device from the one or more endorsement devices in the management network; transmitting the transaction request to the target endorsement device wherein the target endorsement device obtains endorsement signature data according to the transaction data and the reference signature data; and receiving the endorsement signature data transmitted by the target endorsement device, and generating, according to the endorsement signature data and the transaction data, a transaction block.

Correspondingly, an embodiment of this application further provides a non-transitory computer-readable storage medium, storing a computer program, the computer program, when run on a computer, causing the computer to perform the data processing method based on a blockchain network according to the embodiments of this application.

In embodiments of this application, the management network is set in the data processing network; and the endorsement device in the management network validates the data in the transaction request, and performs, according to the instruction of the endorsement policy after the validation of the data succeeds, endorsement signing on the data to be signed that is determined according to the transaction data using the signing key of the corresponding node device, thus obtaining the endorsement signature data. Accordingly, the data validation and endorsement signing operations can be completed by the management network. That is, a consensus operation is completed, and the node devices in the blockchain network are not required to participate in the consensus processing of transactions. Therefore, the time for consensus processing can be saved, and the processing efficiency of a transaction process is improved, thus improving the transaction performance of the entire blockchain network.

DESCRIPTION OF EMBODIMENTS

Figure 1A:
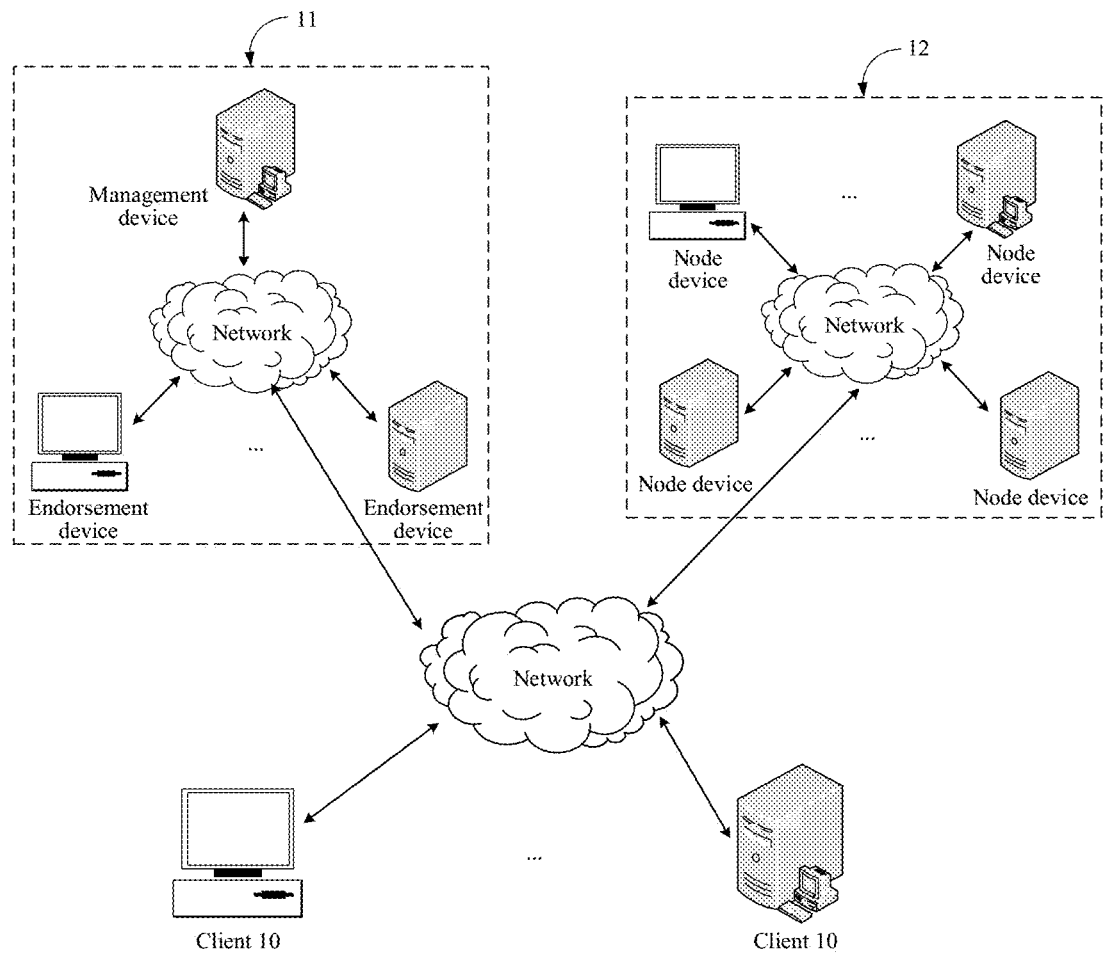
FIG. 1a is a schematic architectural diagram of a data processing network according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

To better understand the embodiments of this application, the following briefly describes some terms involved in the embodiments of this application.

Blockchain: It is a decentralized distributed database, and an intelligent peer-to-peer network that identifies, propagates and records information, also referred to as a value Internet. The blockchain ensures the accuracy of data transmission and query by a consensus mechanism, cryptology, or other technologies, and is tamper-proofing and traceable. The blockchain is a new application mode of a computer technology such as distributed data storage, peer-to-peer transmission, a consensus mechanism, and an encryption algorithm, including a series of associated data blocks generated by a cryptographic method. Each data block includes information of a batch of network transactions, which can be used for validating the information (anti-counterfeiting) and generating a next block.

Generally, the blockchain may include a blockchain underlying platform, a platform product service layer, and an application service layer. The blockchain underlying platform may include processing modules such as a user management module, a basic service module, an intelligent contract module, and an operation supervision module. The user management module is responsible for managing identity information of all blockchain participants, specifically including maintaining public-private key generation (account management), key management, maintaining a correspondence between the real identity of a user and a blockchain address (permission management), and the like, supervising and auditing transaction conditions of some real identities with authorization, and providing rule configuration of risk control (risk control auditing). The basic service module is deployed on all blockchain node devices and configured to verify the validity of a service request, and after a consensus is reached on a valid request, record the valid request in storage. For a new service request, the basic service module may first parse interface adaptation and perform authentication processing (interface adaptation), then encrypt service information by using a consensus algorithm (consensus management), transmit the complete service information after encryption to a shared ledger (network communication), and performs recording and storing. The intelligent contract module is responsible for contract registration and publication, contract triggering, and contract execution. A developer may define contract logic by using a programming language, and release the contract logic onto a blockchain (contract registration). According to the logic of contract, a key or another event is invoked to trigger execution, to complete the contract logic. The function of upgrading or canceling a contract is further provided. The operation supervision module is mainly responsible for deployment, configuration modification, contract setting, cloud adaptation and visualized output of a real-time status during product operation, such as, alarming, monitoring network conditions, and monitoring a health status of a node device.

The platform product service layer provides basic capabilities and an implementation framework of a typical application. Based on these basic capabilities, developers may superpose characteristics of services and complete blockchain implementation of service logic. The application service layer provides a blockchain solution-based application service for a service participant to use.

Trusted Computing (TC): It is a technology promoted and developed by a Trusted Computing Group (or Trusted Computing Cluster, referred to as TCPA). TC is a trusted computing platform based on a hardware security module and widely used in computing and communication systems, which can improve the overall security of the systems. An endorsement key is an RSA public and private key pair with a specific number of bits (for example, 2,048 bits). The endorsement key is randomly generated when a computer device leaves the factor, and cannot be changed. This private key is saved in the computer device, while the public key can be used for authenticating and encrypting sensitive data sent to the computer device.

Cross-domain: It means that in the same blockchain network, if nodes are not deployed in the same cluster, cross-domain access is required between the nodes. The cross-domain may be cross-cluster, cross-region, or the like.

Consortium blockchain: It is only for members of a specific group and limited third parties. Multiple pre-selected nodes are designated as bookkeepers, and the generation of each block is jointly determined by all pre-selected nodes.

Endorsement mechanism: In a blockchain (such as the Hyperledger Fabric blockchain in the consortium blockchain), some nodes undertake an endorsement task, and nodes needing to execute transactions that can be defined using an endorsement policy. A novel idea in blockchain transactions is to separate execution of smart contracts from updating of ledgers to improve the transaction throughput, support finer-grained privacy control, and achieve more flexible and powerful smart contracts. A key factor in achieving these characteristics is to perform explicit transaction endorsement before transactions are added to ledgers. In the blockchain, endorsement can be understood as a process and mechanism by which a node undertaking an endorsement task validates transaction information for a blockchain transaction, and declares the validity of this transaction for the transaction whose validation succeeds. The node undertaking an endorsement task needs to prove its validity based on a valid signature of expected information of a valid certificate.

Endorsement policy: It may be understood as a condition that needs to be satisfied for the endorsement of a transaction, that is, to obtain a conclusion of endorsement success, conditions specified in the endorsement policy need to be satisfied. A blockchain node stores a preassigned endorsement policy set. Conditional judgment of endorsement is implemented in a chaincode. All transactions need to be in accordance with the endorsement policy since that only transactions that have been endorsed are valid and approved. Therefore, the endorsement policy may also be a condition used for instructing a selected node to decide whether a transaction is correct.

Some examples of endorsement policies are as follows: Nodes A, B, C, and F all need to endorse transactions of type T; most nodes in a channel need to endorse transactions of type U; and at least three of nodes A, B, C, D, E, F, and G need to endorse transactions of type V.

In order to reduce the time consumption of a consensus process in the blockchain network and improve the transaction performance based on the blockchain network, embodiments of this application provide a data processing method based on a blockchain network.

The data processing method provided in the embodiments of this application is based on a blockchain technology. In one embodiment, the data processing method provided by the embodiments of this application may also be based on a cloud technology. The cloud technology is a general term of a network technology, an information technology, an integration technology, a management platform technology, an application technology and the like applied based on a cloud computing business mode, can form a resource pool for on-demand use, and is flexible and convenient. The data processing method provided by the embodiments of this application mainly relates to cloud storage, a cloud database, and the like in the cloud technology.

Figure 1B:
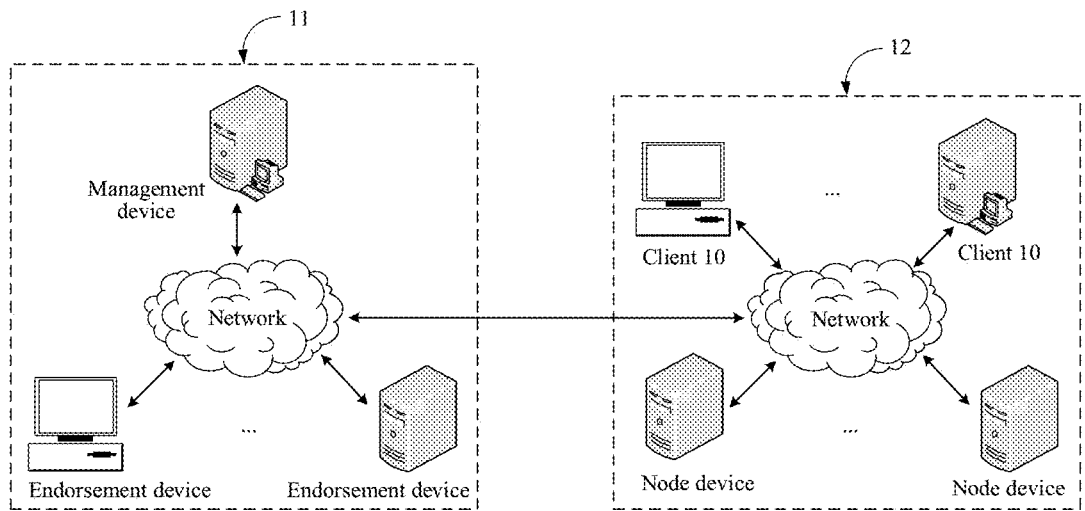
FIG. 1B is a schematic architectural diagram of another data processing network according to an embodiment of this application.

The data processing method provided by the embodiments of this application is applied to a data processing network. The data processing network is as shown in FIG. 1a or FIG. 1B, including a client 10, a management network 11, and a blockchain network 12. The management network 11 includes a management device and one or more endorsement devices, and the blockchain network 12 includes a plurality of node devices. In one embodiment, as shown in FIG. 1a, the client 10 may be in neither the management network 11 nor the blockchain network 12. In another embodiment, as shown in FIG. 1B, the client 10 may be in the blockchain network 12.

In one embodiment, as shown in FIG. 1a or FIG. 1B, the management network 11 and the blockchain network 12 may be two different networks. That is, the management network 11 exists independently of the blockchain network 12. In another embodiment, the management network may also be in the blockchain network. In this case, the management device and the endorsement devices in the management network may be the node devices in the blockchain network, or may be ordinary computer devices in the blockchain network other than the node devices.

The management network 11 may be implemented based on a cloud technology, such as, Tencent cloud or Alibaba cloud. In one embodiment, the endorsement device may be an encryptor, specifically a physical encryptor, or a virtual encryptor. When the endorsement device is the virtual encryptor, the virtual encryptor needs to be hosted on a computer device. When the management network includes a management device and one endorsement device, the endorsement device may be a part of the management device. That is, the endorsement device is set in the management device.

The device (at least one of the endorsement device and the management device) in the management network 11 may be based on TC, and host signing keys of at least part of node devices in the blockchain network. The device may store the signing key of each node device in the blockchain network, or may store the signing keys of part of the node devices in the blockchain network. This part of node devices are node devices that are indicated by an endorsement policy and may be configured to undertake an endorsement task. In one embodiment, the signing key may be a private key of a key pair of a node device. The key pair may be calculated using an RSA encryption algorithm, and includes the private key and a public key. Usually, the private key is used for signing, and the public key is used for unsigning. The endorsement device in the management network may replace the node device in the blockchain network to provide services such as data validation (including signature validation, verification of transaction data, and the like) and endorsement signing, and the management device in the management network may replace the node device in the blockchain network to provide services such as block generation. The endorsement signing is a consensus process.

In this embodiment of this application, the client, the management device, the endorsement device, and the node device may be servers or terminals. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch and the like, but is not limited thereto. The client, the management device, the endorsement device, and the node device may be directly or indirectly connected in a wired or wireless communication manner. This is not limited in this application.

According to the data processing method provided by the embodiments of this application, the management network is set in the data processing network; and the endorsement device in the management network validates data in a transaction request of the client, and performs, according to the instruction of the endorsement policy after the validation of the data succeeds, endorsement signing on data to be signed that is determined according to the transaction data using the signing key of the corresponding node device, thus obtaining endorsement signature data. Thus, the data validation and endorsement signing operations are completed by the management network. That is, a consensus operation is completed, and the nodes in the blockchain network are not required to participate in the consensus processing of transactions. Therefore, the time for consensus processing can be effectively saved, and the processing efficiency of a transaction process is improved, thus improving the transaction performance of the entire blockchain network.

Figure 2:
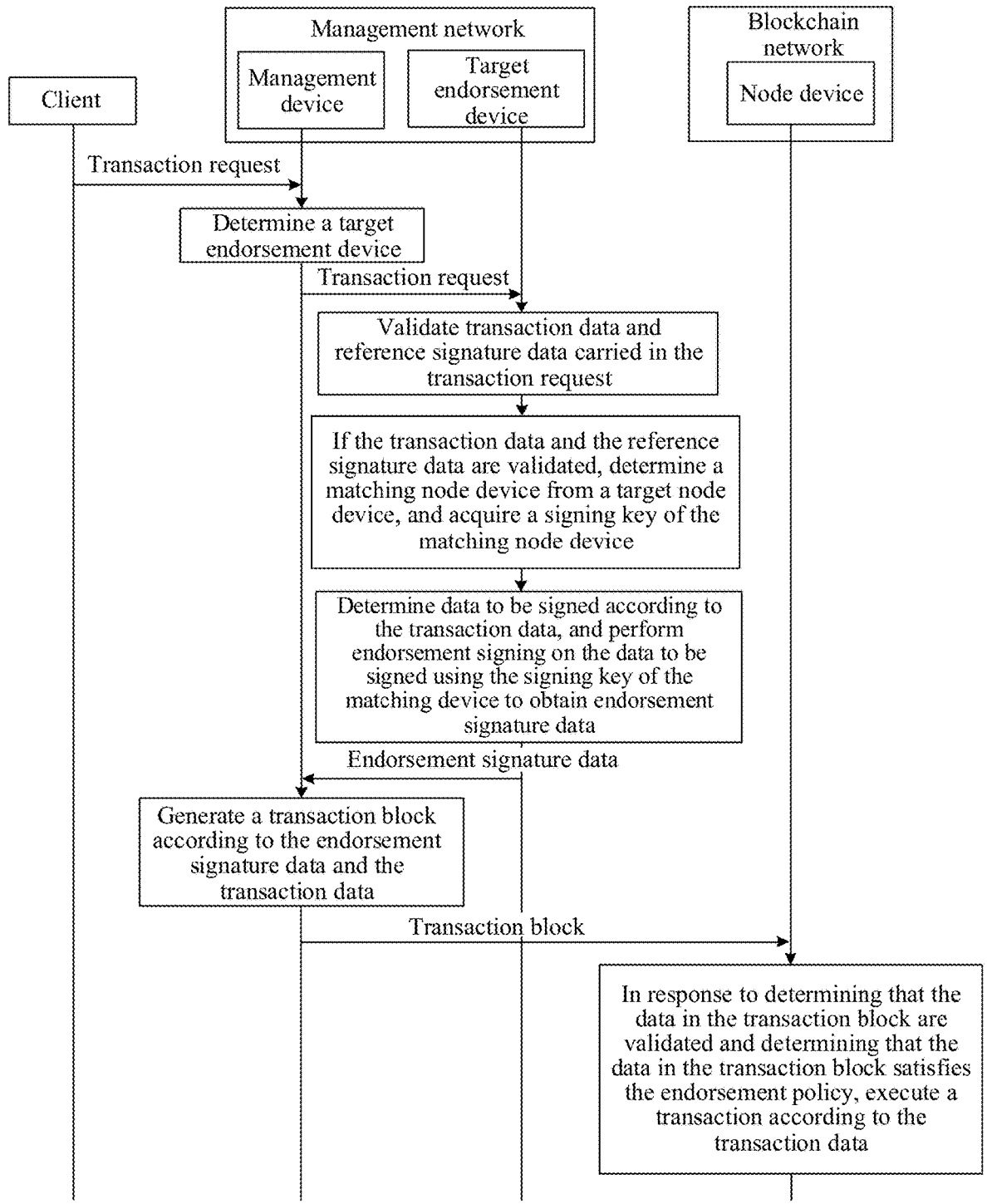
FIG. 2 is a schematic flowchart of a data processing method according to an embodiment of this application.

Referring to FIG. 2, a schematic flowchart of a data processing method based on a blockchain network provided according to an embodiment of this application is illustrated. The data processing method based on a blockchain network described in the embodiments of this application can be applied to a data processing network shown in FIG. 1a or FIG. 1B. The method includes, but is not limited to, the following steps:

S201. Transmit, by a client, a transaction request to a management device in a management network, the transaction request carrying transaction data and reference signature data corresponding to the transaction data.

In one embodiment, the reference signature data may be obtained by signing the transaction data by the client using a private key in a key pair of the client. The key pair may be calculated using an RSA encryption algorithm, and includes the private key and a public key. Usually, the private key is used for signing, and the public key is used for unsigning.

S202. Acquire, by the management device, the transaction request transmitted by the client, and determine a target endorsement device from one or more endorsement devices in the management network.

According to different storage situations of a signing key of a node device, the following two methods can be used to determine a target endorsement device.

Method I:

Each endorsement device in the management network stores the signing keys of part of the node devices in the blockchain network, and each endorsement device store the signing keys of different node devices respectively. The node devices corresponding to all the signing keys stored by the endorsement devices in the management network may be all the node devices in the blockchain network, or may be part of the node devices in the blockchain network. This part of node devices are node devices that are indicated by an endorsement policy and may be configured to undertake an endorsement task.

Figure 3:
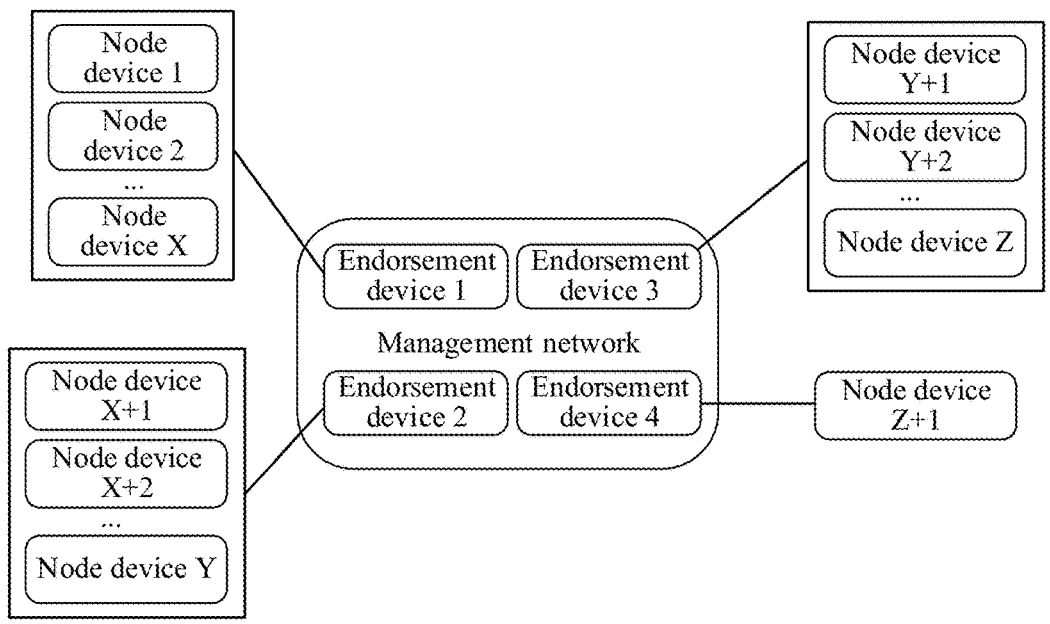
FIG. 3 illustrates a correspondence relationship between an endorsement device and a node device in an embodiment of this application.

As shown in FIG. 3, each endorsement device in the management network stores the signing keys of one or more node devices in the blockchain network. For example, an endorsement device 1 stores the signing keys of X node devices 1 to X in the blockchain network, and an endorsement device 4 stores the signing key of a node device Z+1 in the blockchain network.

In some embodiments, multiple node devices in the blockchain network may be deployed in different clusters. For example, as shown in FIG. 3, the node devices 1 to X are deployed in one cluster; the node devices X+1 to Y are deployed in another cluster; and the node devices Y+1 to Z are deployed in yet another cluster. The endorsement devices in the management network store the signing keys of one or more node devices belonging to the same cluster in the blockchain network.

After receiving the transaction request transmitted by the client, the management device may determine, according to an instruction of the endorsement policy, a target node device from the plurality of node devices in the blockchain network, and there is one or more target node devices. The determined target node device is the node device that is indicated by the endorsement policy and undertakes the endorsement task for the current transaction. For example, if the client initiates a transaction of type T, according to a preset instruction of the endorsement policy, node devices A, B, C, and F in the blockchain network need to endorse the transaction of type T. The node devices A, B, C, and F in the blockchain network are then determined as the target node devices.

Further, the management device determines, according to the recorded situation of each endorsement device storing the signing key of the node device and the determined target node device, an endorsement device that stores the signing key of the target node device from the one or more endorsement devices in the management network, and determines the endorsement device that stores the signing key of the target node device as the target endorsement device. There are one or more target endorsement devices being determined, and the signing keys stored in the target endorsement devices include the signing key of each target node device. When transmitting the transaction request from the client to the target endorsement device, the management device can transmit information (for example, a node numbering) of the target node device, i.e., can transmit information of the target node device whose corresponding signing key is stored in the target endorsement device.

Method II:

Each endorsement device in the management network stores the signing key of each node device in the blockchain network, or each endorsement device in the management network stores the signing keys of the same part of the node devices in the blockchain network. This part of node devices are all the node devices indicated by the endorsement policy and possibly configured to undertake the endorsement task.

After receiving the transaction request transmitted by the client, the management device acquires current state parameters of each endorsement device in the management network. The state parameters may include a parameter used for indicating a network condition, a parameter used for indicating a load condition, and the like. A target endorsement device configured to respond to the transaction request is determined, according to the current state parameters of each endorsement device, from one or more endorsement devices in the management network. For example, an endorsement device with a good current network condition and a low load may be determined as the target endorsement device configured to respond to the transaction request. There are one or more target endorsement devices being determined.

In some embodiments, a selection order of each endorsement device can be preset, and one or more target endorsement devices currently used for providing endorsement services are selected, according to the selection order, from the one or more endorsement devices in the management network. For example, the set selection order of endorsement devices is (endorsement device 1)→(endorsement devices 2 and 3)→(endorsement devices 4 and 5). The endorsement devices 2 and 3 are to be selected to provide the endorsement service at this time if the endorsement device 1 provides the endorsement service at the previous time.

In some embodiments, when there are multiple target endorsement devices being determined, the management device may correspondingly set the endorsement task undertaken by each endorsement device. For example, according to the instruction of the endorsement policy, target node devices 1 to 10 are required to undertake the endorsement task for the current transaction. If the endorsement devices 2 and 3 are selected to provide the endorsement service at this time, it can be set that the endorsement device 2 undertakes the endorsement tasks corresponding to the target node devices 1 to 3, and that the endorsement device 3 undertakes the endorsement tasks corresponding to the target node devices 4 to 10. When transmitting the transaction request of the client to the target endorsement device, the management device may transmit endorsement task indication information corresponding to the target endorsement device together. The endorsement task indication information is used for indicating an endorsement task that needs to be undertaken by the target endorsement device and corresponds to the target node device.

In one embodiment, the transaction request also carries a device identifier of the client. After receiving the transaction request transmitted by the client, the management device first determines whether the client has a permission to initiate the transaction request, including detecting whether the device identifier of the client is in a preset white list; determining, if the device identifier of the client is in the preset white list, that the client has the permission to initiate the transaction request; and determining, if the device identifier of the client is not in the preset white list, that the client does not have the permission to initiate the transaction request. If the client has the permission to initiate the transaction request, the target endorsement device is determined from the one or more endorsement devices in the management network. If the client does not have the permission to initiate the transaction request, the transaction request of the client is directly rejected.

S203. Transmit, by the management device, the transaction request of the client to the target endorsement device.

S204. Acquire, by the target endorsement device, the transaction request of the client, and validate the transaction data and reference signature data carried in the transaction request.

In one embodiment, if the reference signature data is obtained by signing the transaction data using the private key in the key pair of the client, the target endorsement device acquires the public key in the key pair of the client, and unsigns the reference signature data using the public key to obtain unsigned data; if the unsigned data matches the transaction data, it indicates that the transaction data is not tampered, and whether the transaction data has executability is further detected, including detecting whether a transaction corresponding to the transaction data is valid, has been executed, or the like; if the transaction is valid and has not been executed, it can be determined that the transaction data has the executability; and if the transaction data has the executability, it can be determined that the validation of the transaction data and the reference signature data in the transaction request succeeds.

In some embodiments, the public key of the client may be carried in the transaction request, or may be stored in each endorsement device, or may be stored in the management device. When the public key of the client is stored in the management device, the target endorsement device may actively acquire the public key of the client from the management device, or the management device may transmit, while transmitting the transaction request of the client to the target node device, the public key to the target endorsement device.

S205. If the validation of the transaction data and the reference signature data succeeds, determine, by the target endorsement device, a matching node device from the target node device, and acquire the signing key of the matching node device. The target node device is determined, according to the instruction of the endorsement policy, from the plurality of node devices in the blockchain network.

In the embodiments of this application, when the validation of the transaction data and the reference signature data succeeds, the target endorsement device determines to undertake endorsement tasks corresponding to which target node devices, namely determines the matching node device. There may be one or more matching node devices in one or more target node devices that are indicated by the endorsement policy and need to undertake the endorsement task for the current transaction.

In the case indicated in method I in step S202, the matching node device is the target node device, the corresponding signing key of which is stored in the target endorsement device, among the one or more target node devices. The target endorsement device may first determine, from the plurality of node devices in the blockchain network, one or more target node devices that need to undertake the endorsement task for the current transaction, and then determine, from the one or more target node devices, a target node device storing the corresponding signing key as the matching node device. In another embodiment, if information, transmitted by the management device, of a target node device whose corresponding signing key is stored in the target endorsement device is received, the target node device indicated by the information is directly determined as the matching node device.

In the case indicated in method II in step S202, the matching node device is the target node device needing to undertake the corresponding endorsement task among the one or more target node devices.

The signing key of the matching node device is acquired after the matching node device is determined. In one embodiment, the signing key may be a private key of a key pair of a node device. The key pair may be calculated using an RSA encryption algorithm, and includes the private key and a public key. Usually, the private key is used for signing, and the public key is used for unsigning.

S206. Determine, by the target endorsement device, data to be signed according to the transaction data, and perform endorsement signing on the data to be signed using the signing key of the matching node device to obtain endorsement signature data.

In one embodiment, the target endorsement device simulates, according to the transaction data, execution of a transaction to obtain a simulated transaction result, determines, according to the simulated transaction result, a voting result corresponding to the transaction request, and generates, for example, if the simulated transaction result indicates that the transaction can be correctly executed, an approved voting result. Further, the determined voting result is used as the data to be signed; the data to be signed is signed respectively using the signing keys of each matching node device to obtain the endorsement signature data corresponding to each signing key.

S207. Transmit, by the target endorsement device, the endorsement signature data to the management device.

S208. Receive, by the management device, the endorsement signature data transmitted by the target endorsement device, and generate, according to the endorsement signature data and the transaction data, a transaction block.

In the embodiments of this application, the management device receives one or more pieces of endorsement signature data transmitted by each target endorsement device, and generates, according to the received endorsement signature data and the transaction data after receiving the endorsement signature data transmitted by each target endorsement device, the transaction block.

In one embodiment, after receiving the endorsement signature data transmitted by the target endorsement device, the management device first validates the endorsement signature data (that is, validate signatures), and generates, after the validation of each piece of endorsement signature data succeeds, a transaction block. If there is endorsement signature data failing in the validation, the corresponding endorsement device (which may be an original endorsement device or may be a newly designated endorsement device) is instructed to re-perform the corresponding endorsement signing operation. The method for validating the endorsement signature data may refer to the following description.

In one embodiment, the management device may add the generated transaction block to a blockchain stored in the management device for depositing. In another embodiment, the management device may generate, according to the transaction request of the client and the transaction block, a depositing block, and add the generated depositing block to a blockchain stored in the management device for depositing.

S209. Broadcast, by the management device, the transaction block to the node devices in the blockchain network.

S210. Execute, by the node device in the blockchain network, a transaction according to the transaction data in response to determining that the validation of the data in the transaction block succeeds and determining that the data in the transaction block satisfies the endorsement policy.

In the embodiments of this application, after receiving the transaction block broadcast by the management device, the node devices in the blockchain network extract the transaction data from the transaction block and each piece of endorsement signature data, and validate the transaction data and the endorsement signature data. The validation of the transaction data includes validation of the correctness of a field and the validity of a transaction.

The method for validating the endorsement signature data may be determining, from the plurality of node devices in the blockchain network according to the instruction of the endorsement policy, each target node device that needs to undertake an endorsement task for a transaction corresponding to the transaction data; and acquiring unsigning keys of each target node device. In one embodiment, each node device in the blockchain network stores the unsigning keys of all the node devices that are indicated by the endorsement policy and possibly configured to undertake the endorsement task. At this time, the unsigning keys of each target node device can be directly locally acquired. In another embodiment, the unsigning keys of all the node devices that are indicated by the endorsement policy and possibly configured to undertake the endorsement task, or the unsigning keys of all the node devices in the blockchain network may be stored in a cloud database. At this time, the unsigning keys of each target node device need to be acquired from the cloud database. The unsigning key and the signing key constitute a key pair. The signing key may be a private key in the key pair, and the unsigning key may be a public key in the key pair. The key pair may be calculated by the RSA encryption algorithm. Further, each piece of endorsement signature data is unsigned using the unsigning key of each target node device, and each piece of endorsement signature data is validated based on the unsigned data after the unsigning succeeds.

If the unsigning key of each target node device can be used to successfully unsign each piece of corresponding endorsement signature data, the unsigning key of any target node device matches the signing key used by at least one piece of endorsement signature data, and unsigning result indicates that all voting results or most (exceeding ⅔) of the voting results agree to execute the transaction corresponding to the transaction data, it is determined that the endorsement policy is satisfied.

When the validation of the data in the transaction block succeeds, and it is detected that the data in the transaction block satisfies the endorsement policy, the node devices in the blockchain network may execute the transaction according to the transaction data. After the transaction is executed, a transaction result may be recorded in a ledger (or a block is generated according to the transaction result, and the block is uploaded). In one embodiment, the node devices in the blockchain network may also add the received transaction block to a blockchain stored in the node devices for depositing.

When the target endorsement device obtains the endorsement signature data, the target endorsement device may perform endorsement signing on the data to be signed (for example, a voting result corresponding to the transaction request) and the transaction data using the signing key of the matching node device to obtain the endorsement signature data. The target endorsement device may transmit the data to be signed while transmitting the endorsement signature data to the management device. During the generation of the transaction block, the management device may generate the transaction block according to the endorsement signature data, the transaction data, and the data to be signed. The above-mentioned data is added in the process of generating the endorsement signature data and the transaction block for subsequent data validation. In addition, if the management device in the management network hosts the signing keys of at least part of the node devices in the blockchain network, while transmitting the transaction request to the target endorsement device, the management device may transmit the signing key of the matching node device corresponding to the target endorsement device such that the target endorsement device executes the corresponding endorsement task.

In the embodiments of this application, the management device and the endorsement device use TC. The endorsement device in the management network is used to replace the node device in the blockchain network to provide services such as the data validation and the endorsement signing. That is, the endorsement device is used to complete a consensus operation. The management device in the management network is used to replace the node devices in the blockchain network to provide services such as the block generation. Accordingly, the transaction consensus processing and the block generation can be completed by the management network, and the node devices in the blockchain network are not required to participate in the consensus processing of transactions and the generation of blocks. Therefore, compared with the current method where most of the node devices in the blockchain network are required to participate the consensus processing, this solution can effectively save the time for the consensus processing, thus improving the processing efficiency of a transaction process and achieving an effect of improving the transaction performance of the entire blockchain network.

The data processing method provided according to the embodiments of this application is a cross-domain blockchain node governance solution. At present, many service providers provide Platform as a Service (Paas) of the blockchain or various solutions related to the blockchain. In most deployment forms, all nodes in the same blockchain network are deployed together, which can improve the transaction performance of the blockchain network to an extremely large extent. However, in order to reflect real decentralization, cross-domain distributed deployment of blockchain nodes, or deployment to different client environments, will be a norm in the future. The nodes communicate with each other through a public network, and the transaction performance of the entire network will face a huge challenge.

At present, there is no unified solution for the governance of the cross-domain blockchain nodes. It is common to divide part of the blockchain nodes as consensus nodes, and these consensus nodes provide consensus services and packed blocks. However, this can only improve the transaction performance to a certain extent. There is also a performance bottleneck in case of high transaction concurrency. Since signatures need to be collected for transactions, the common solution cannot be used in most blockchain engines due to its poor generality.

A transaction process of the blockchain has a great impact on the transaction performance. Usually, each transaction can only be executed by each node after succeeding in the consensus processing. Many consensus algorithms are provided in a public blockchain, such as PoW and PoS. Usually, all the nodes in the public blockchain are consensus nodes and need to participate in the consensus process, so the transaction performance is extremely inefficient. For example, a consortium blockchain is generally used among enterprises. The consortium blockchain generally separates a consensus service to improve the transaction performance to a certain extent. The cross-domain blockchain node governance solution provided by the embodiments of this application is mainly aimed at the consortium blockchain.

Figure 4:
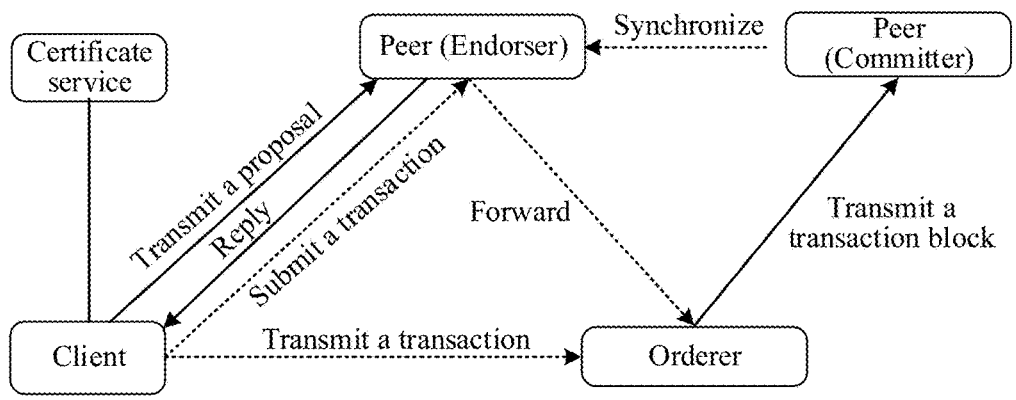
FIG. 4 illustrates a transaction process of a Fabric blockchain.

Referring to FIG. 4, a transaction process of a Fabric blockchain is illustrated. Node Orderer is used for providing a block packing service. Node Pee is used for executing a transaction and recording a ledger. It may be Endorser or Committer. A Certificate Authority (CA) may provide a certificate service, which can generate a corresponding key for the client. The transaction process mainly includes the following steps:

The client transmits a transaction proposal (or transaction request) to the Endorser. After receiving the proposal, the Endorser verifies a proposal signature and detects whether a channel Access Control List (ACCL) is satisfied, including checking whether the client can perform an operation in a current channel, and the like. If the verification of the proposal signature succeeds, and it is detected that the channel ACL is satisfied, the execution of transaction is simulated, and a result (which can be a voting result generated according to a simulated execution result of the transaction) is signed. The Endorser returns a result signature to the client. The client receives the result signature returned by the Endorser, verifies the result signature, compares reply results of multiple Endorsers, and detects whether enough result signatures are collected. If the client has collected enough result signatures, and the reply results of most of Endorsers indicate agreement to execute the transaction, the client will transmit transaction data to the node Orderer. The transaction data may be transmitted to the Endorser, and the Endorser forwards the transaction data to the node Orderer. The node Orderer sorts the transactions to construct a transaction block, and transmits the transaction block to the Committer. The Committer checks a transaction structure and a signature for the transaction block, and checks whether the transaction satisfies an endorsement policy; and if the checking of the transaction structure and signature succeeds, and it is checked that the transaction satisfies the endorsement policy, a valid transaction in the transaction block is executed, and a ledger state is updated. In the process of processing the transaction block, the Committer can synchronize processing data about the transaction block with the Endorser.

In the above transaction process, the steps executed by the client may be specifically executed by an application program (APP) or a software development kit (SDK) configured in the client. From the transaction process of the Fabric blockchain, it can be seen that there are multiple signature verification operations from the client transmitting the transaction proposal to the node Peer executing the transaction finally, and this is also the most time-consuming aspect of each transaction. The endorsement signing is a consensus process. A transaction can be executed normally only when enough endorsement signatures are collected. If the Endorsers are deployed in a distributed cross-domain manner, the nodes communicate with each other through a public network. During collection of the endorsement signatures for each transaction, the network stability, bandwidth, and the like of the public network will affect the performance of the entire transaction.

Figure 5:
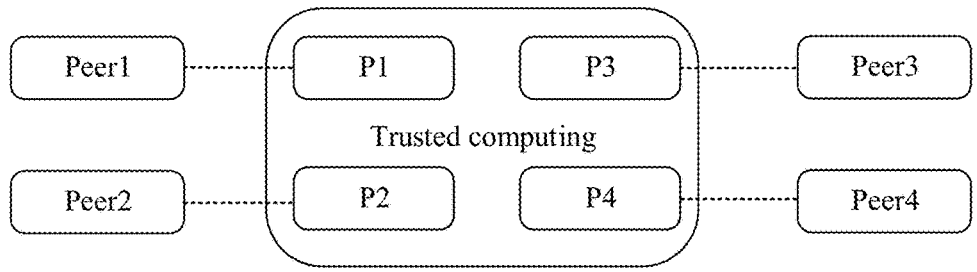
FIG. 5 illustrates an architecture of a cross-domain blockchain node governance solution provided according to an embodiment of this application.

Referring to FIG. 5, an architecture of a cross-domain blockchain node governance solution provided according to an embodiment of this application is illustrated. According to the cross-domain blockchain node governance solution provided according to the embodiments of this application, a TC region (which is equivalent to the foregoing management network) is planned in combination with TC, and the private key (or the signing key) of each node in the blockchain network is hosted to the TC region, so that a consensus signing (that is, endorsement signing) operation of the transaction is completed in the TC region; and blocks are packed in the TC region and are allocated to each node in the blockchain network; and after receiving the blocks, the nodes only need to validate the blocks and execute valid transactions in the blocks. The TC ensures the security of the private keys of the nodes and the reliability of the data. In the TC region, there are services corresponding to node (P1-P4 as shown in FIG. 5), the private keys of the corresponding nodes are hosted, and a signing service is provided. As shown in FIG. 5, P1-P4 host the private keys of Peer1-Peer4 respectively, and provide corresponding endorsement signing services. P1-P4 in FIG. 5 are equivalent to the foregoing endorsement devices, which may be encryptors. Accordingly, the endorsement signing of a transaction can be completed in the TC region, thereby reducing the allocation of requests in a network and speeding up the processing of the transaction process.

Figure 6:
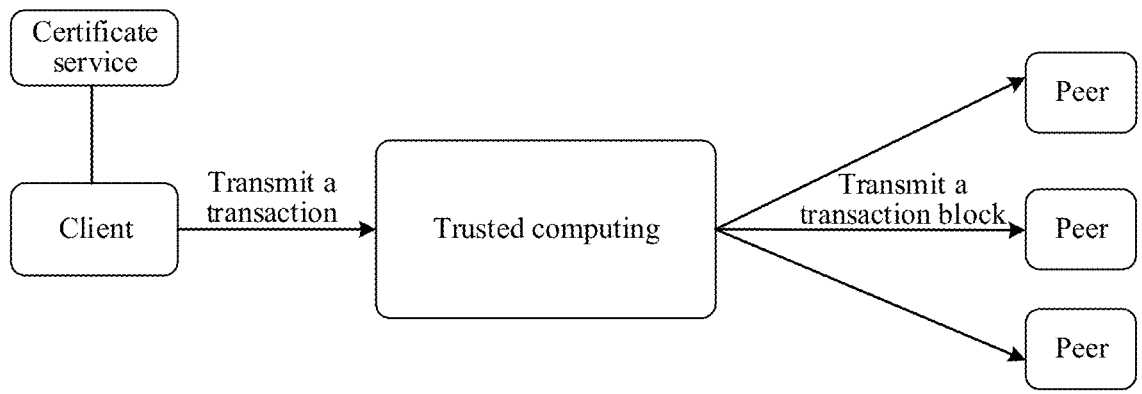
FIG. 6 illustrates another architecture of a cross-domain blockchain node governance solution provided according to an embodiment of this application.

Referring to FIG. 6, another architecture of a cross-domain blockchain node governance solution provided according to an embodiment of this application is illustrated. The specific transaction process of the cross-domain blockchain node governance solution provided according to the embodiments of this application is as follows: First, the client transmits the transaction request to the TC region after registering a certificate through CA (that is, obtaining a corresponding key). The TC region verifies the transaction signature carried in the transaction request after receiving the transaction request; performs, according to the instruction of the endorsement policy after the signature verification succeeds, endorsement signing on transactions using the hosted private keys of the corresponding nodes; and packs, after collecting enough endorsement signatures, the transactions to generate the transaction block, and allocates the transaction block to the node Peer. After receiving the transaction block, the node Peer checks the transaction structure and the signature, and checks whether the transaction satisfies the endorsement policy; and if the checking of the transaction structure and endorsement signature succeeds and the transaction satisfies the endorsement policy, the valid transaction in the transaction block is executed, and the ledger state is updated. The specific implementation of each step in the above transaction process can refer to the description in the previous embodiment. In addition, the above transaction process only points out some main steps. For different blockchain engines, the transaction process will be different in some aspects, but the idea is to perform consensus signing (that is, endorsement signing), and the TC region hosts the private keys of the nodes and completes the consensus processing of the transactions.

In the embodiments of this application, in combination with the TC, the signing key of each node in the blockchain network is hosted in the TC region, and the TC region provides data validation and endorsement signing services, as well as a block generation service. Each node in the blockchain network is only responsible for recording ledgers. This mode can improve the endorsement signing (i.e., consensus processing) efficiency while ensuring the security and reliability of information, thereby speeding up the transaction processing and greatly improving the transaction performance of the entire network. Furthermore, this mode can be multiplexed in all blockchain engines due to its good generality.

Figure 7:
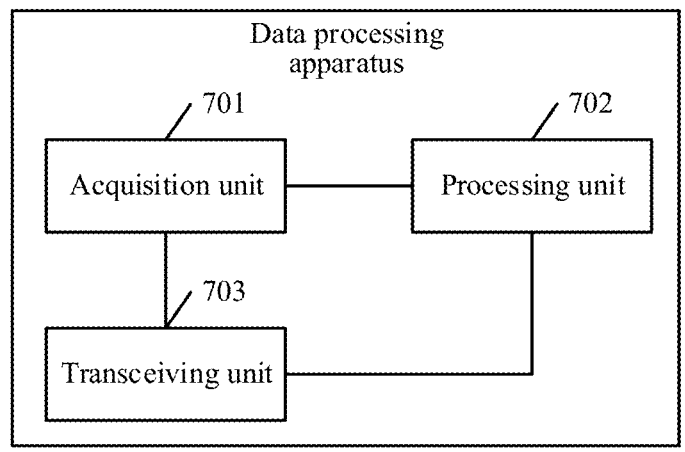
FIG. 7 is a schematic structural diagram of a data processing apparatus according to an embodiment of this application.

Referring to FIG. 7, a schematic structural diagram of a data processing apparatus based on a blockchain network according to an embodiment of this application is illustrated. The blockchain network is in a data processing network; the blockchain network includes a plurality of node devices; the data processing network further includes a management network; the management network includes a management device and one or more endorsement devices; and the architecture of the data processing network may refer to FIG. 1a or FIG. 1B. The apparatus includes an acquisition unit 701, a processing unit 702, and a transceiving unit 703.

In one embodiment, the data processing apparatus described in the embodiments of this application corresponds to the foregoing target endorsement device, and functions achieved by the units are as follows:

the acquisition unit 701 is configured to acquire a transaction request, the transaction request carrying transaction data and reference signature data corresponding to the transaction data;

the processing unit 702 is configured to validate the transaction data and the reference signature data;

the processing unit 702 is further configured to determine, in a case that the validation of the transaction data and the reference signature data succeeds, a matching node device from a root target node device, and acquire a signing key of the matching node device, the target node device being determined, according to an instruction of an endorsement policy, from a plurality of node devices in the blockchain network;

the processing unit 702 is further configured to determine data to be signed according to the transaction data, and perform endorsement signing on the data to be signed using the signing key of the matching node device to obtain endorsement signature data; and the transceiving unit 703 is configured to transmit the endorsement signature data to the management device such that the management device generates a transaction block according to the endorsement signature data and the transaction data.

In one embodiment, the endorsement device in the management network stores the signing keys of at least part of the node devices in the blockchain network.

In one embodiment, each endorsement device in the management network stores the signing keys of part of the node devices in the blockchain network, and each endorsement device store the signing keys of different node devices respectively. The acquisition unit 701 is specifically configured to trigger the transceiving unit 703 to receive the transaction request transmitted by the management device, the transaction request being originated from the client. After receiving the transaction request transmitted by the client, the management device determines, according to the instruction of the endorsement policy, the target node device from the plurality of node devices in the blockchain network, and transmits the transaction request to a target endorsement device that stores the signing key of the target node device.

In one embodiment, each endorsement device in the management network stores the signing key of each node device in the blockchain network. The acquisition unit 701 is specifically configured to trigger the transceiving unit 703 to receive the transaction request transmitted by the management device, the transaction request being originated from the client. After receiving the transaction request transmitted by the client, the management device determines, according to current state parameters of each endorsement device, a target endorsement device that responds to the transaction request from each endorsement device, and transmits the transaction request to the target endorsement device.

In one embodiment, when determining the data to be signed according to the transaction data, the processing unit 702 is specifically configured to simulate, according to the transaction data, execution of a transaction to obtain a simulated execution result; and determine, according to the simulated transaction result, a voting result corresponding to the transaction request, and take the voting result as the data to be signed.

In one embodiment, the reference signature data is obtained by signing the transaction data using a private key in a key pair, and the acquisition unit 701 is further configured to acquire a public key in the key pair; and the processing unit 702 is further configured to unsign the reference signature data using the public key to obtain unsigned data; detect, in a case that the unsigned data matches the transaction data, whether the transaction data has executability; and determine, in a case that the transaction data has the executability, that the validation of the transaction data and the reference signature data succeeds.

It may be understood that functions of functional units of the data processing apparatus provided in the embodiments of this application may be specifically implemented according to the methods corresponding to the target endorsement device in the foregoing method embodiments. For a specific implementation process, reference may be made to related descriptions for the foregoing method embodiments, and details are not described herein again.

In another embodiment, the data processing apparatus described in the embodiments of this application corresponds to the foregoing management device, and functions achieved by the units are as follows:

the acquisition unit 701 is configured to acquire a transaction request, the transaction request carrying transaction data and reference signature data corresponding to the transaction data;

the processing unit 702 is configured to determine a target endorsement device from the one or more endorsement devices in the management network;

the transceiving unit 703 is configured to transmit the transaction request to the target endorsement device such that the target endorsement device obtains endorsement signature data according to the transaction data and the reference signature data;

the transceiving unit 703 is further configured to receive the endorsement signature data transmitted by the target endorsement device; and the processing unit 702 is further configured to generate a transaction block according to the endorsement signature data and the transaction data.

In one embodiment, the endorsement device in the management network stores the signing keys of at least part of the node devices in the blockchain network.

In one embodiment, each endorsement device in the management network stores the signing keys of part of the node devices in the blockchain network, and each endorsement device stores the signing keys of different node devices respectively. The processing unit 702 is specifically configured to determine, according to an instruction of an endorsement policy, a target node device from the plurality of node devices in the blockchain network; determine, from each endorsement device in the management network, an endorsement device that stores the signing key of the target node device, and determine the endorsement device that stores the signing key of the target node device as the target endorsement device.

In one embodiment, each endorsement device in the management network stores the signing keys of each node device in the blockchain network, and the apparatus further includes an acquisition unit 701, configured to acquire current state parameters of each endorsement device in the management network; and the processing unit 702 is configured to determine, according to the current state parameters of each endorsement device, an endorsement device that responds to the transaction request from each endorsement device in the management network, and determine the endorsement device that responds to the transaction request as the target endorsement device.

In one embodiment, the processing unit 702 is further configured to trigger the transceiving unit 703 to broadcast the transaction block to the node devices in the blockchain network such that the node devices in the blockchain network execute a transaction according to the transaction data in response to determining that the validation of the data in the transaction block succeeds and determining that the data in the transaction block satisfies the endorsement policy.

It may be understood that functions of functional units of the data processing apparatus provided in the embodiments of this application may be implemented according to the methods corresponding to the management device in the foregoing method embodiments. For a specific implementation process, reference may be made to related descriptions for the foregoing method embodiments, and details are not described herein again.

In the embodiments of this application, the management network is set in the data processing network; and the endorsement device in the management network validates the data in the transaction request, and performs, according to the instruction of the endorsement policy after the data is validated, endorsement signing on the data to be signed that is determined according to the transaction data using the signing key of the corresponding node device, thus obtaining the endorsement signature data. Accordingly, the data validation and endorsement signing operations can be completed by the management network, that is, a consensus operation is completed, and the nodes in the blockchain network are not required to participate in the consensus processing of transactions. Therefore, the time for consensus processing can be effectively saved, and the processing efficiency of a transaction process is improved, thus improving the transaction performance of the entire blockchain network.

Figure 8:
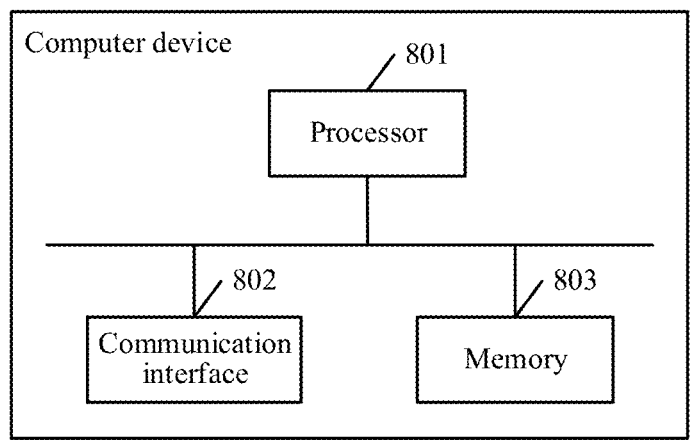
FIG. 8 is a schematic structural diagram of a computer device according to an embodiment of this application.

Referring to FIG. 8, a schematic structural diagram of a computer device provided according to an embodiment of this application is illustrated. The computer device described in the embodiments of this application includes: a processor 801, a communication interface 802, and a memory 803. The processor 801, the communication interface 802, and the memory 803 may be connected via a bus or in another manner. Connection via a bus is used as an example in the embodiments of this application.

The processor 801 (or central processing unit (CPU)) is a calculation core and a control core of the computer device, which can parse instructions in the computer device and data of the computer device. For example, the CPU may be used to parse an on/off instruction sent by the user to the computer device, and control the computer device to perform on/off operations. For another example, the CPU may transmit interaction data between internal structures of the computer device, and the like. In some embodiments, the communication interface 802 may include a standard wired interface and a standard wireless interface (such as Wi-Fi and a mobile communications interface), and is controlled by the processor 801 to be configured to send and receive data. The memory 803 is a memory device of the computer device, and is configured to store a program and data. It may be understood that the memory 803 herein may include an internal storage memory of the computer device and certainly may also include an extended memory supported by the computer device. The memory 803 provides storage space. The storage space stores an operating system of the computer device, which may include, but is not limited to: an Android system, an iOS system, a Windows Phone system and the like. This is not limited in this application.

In the embodiments of this application, the computer device described in the embodiments of this application corresponds to the foregoing target endorsement device or management device and is achieved based on the blockchain network. The blockchain network is in a data processing network; the blockchain network includes a plurality of node devices; the data processing network further includes a management network; the management network includes a management device and one or more endorsement devices; and the architecture of the data processing network may refer to FIG. 1a or FIG. 1B.

In one embodiment, the computer device described in the embodiments of this application corresponds to the foregoing target endorsement device. At this time, the processor 801 executes the operations, described in the above method embodiment, on the target endorsement device side by running executable program codes in the memory 803.

The processor 801, the communication interface 802, and the memory 803 described in the embodiments of this application can execute the implementation of the target endorsement device described in the data processing method based on a blockchain network according to the embodiments of this application, and can also execute the implementation corresponding to the target endorsement device and described in the data processing apparatus based on a blockchain network according to the embodiments of this application. Descriptions thereof are omitted here.

In another embodiment, the computer device described in the embodiments of this application corresponds to the foregoing management device. At this time, the processor 801 executes the operations, described in the above method embodiments, on the management device side by running executable program codes in the memory 803.

In another embodiment, the processor 801, the communication interface 802, and the memory 803 described in this application can execute the implementation of the management device described in the data processing method based on a blockchain network according to the embodiments of this application, and can also execute the implementation corresponding to the management device and described in the data processing apparatus based on a blockchain network according to the embodiments of this application. Descriptions thereof are omitted here.

The embodiments of this application further provide a computer-readable storage medium, storing a computer program, the computer program, when run on a computer, causing the computer to perform the data processing method based on a blockchain network according to the embodiments of this application. In one embodiment, reference may be made to the foregoing descriptions, and details are not described herein again.

The embodiments of this application further provide a computer program product or a computer program, including computer instructions, the computer instructions being stored in a computer-readable storage medium. A processor of a computer device reads the computer instructions from the computer-readable storage medium and executes the computer instructions, causing the computer device to perform the data processing method based on a blockchain network according to the embodiments of this application. In one embodiment, reference may be made to the foregoing descriptions, and details are not described herein again.

It is to be noted that for simple descriptions, the foregoing method embodiments are stated as a series of action combinations. However, a person skilled in the art should know that this application is not limited to the sequence of the described actions because according to this application, some steps may use another sequence or may be simultaneously performed. In addition, a person skilled in the art is further to understand that the embodiments described in this specification are exemplary embodiments, and the involved actions and modules mentioned are not necessarily required by this application.

A person of ordinary skill in the art may understand that all or some of the steps of the methods in the foregoing embodiments may be implemented by a program instructing relevant hardware. The program may be stored in a computer-readable storage medium. The storage medium may include: a flash disk, a read-only memory (ROM), a random access memory (RAM), a magnetic disk, an optical disc, or the like.

The foregoing disclosure is merely some embodiments of this application, and certainly is not intended to limit the protection scope of this application. Therefore, equivalent variations made in accordance with the claims of this application shall fall within the scope of this application.

What is claimed is:

1. A data processing method based on a blockchain network, the blockchain network being in a data processing network and comprising a plurality of node devices, the data processing network further comprising a management network, the management network comprising a management device and a plurality of endorsement devices, the plurality of endorsement devices each storing signing keys of at least some of the plurality of node devices, and the method, implemented by a target endorsement device of the plurality of endorsement devices in the management network, the target endorsement device being selected by the management device based on a transaction request, an endorsement policy, and the signing keys stored at each of the plurality of endorsement devices, comprising:

acquiring the transaction request from the management device, the transaction request carrying transaction data and reference signature data corresponding to the transaction data;

validating the transaction data and the reference signature data;

determining a matching node device from one or more target node devices in response to the transaction data and the reference signature data being validated, the matching node device corresponding to the target endorsement device, and acquiring a signing key of the matching node device stored at the target endorsement device, the one or more target node devices being identified from the plurality of node devices in the blockchain network according to the endorsement policy;

determining data to be signed according to the transaction data, and signing on the data to be signed using the signing key of the matching node device to obtain endorsement signature data; and transmitting the endorsement signature data to the management device, wherein the management device generates a transaction block according to the endorsement signature data and the transaction data, wherein the determining the data to be signed according to the transaction data comprises:

simulating execution of a transaction to obtain a simulated transaction result based on the transaction data; and determining a voting result corresponding to the transaction request according to the simulated transaction result, and taking the voting result as the data to be signed.

2. The method according to claim 1, wherein each endorsement device store the signing keys of different node devices respectively; the acquiring a transaction request comprises:

receiving the transaction request transmitted by the management device, the transaction request being originated from a client, wherein upon receiving the transaction request transmitted by the client, the management device determines the one or more target node devices from the plurality of node devices in the blockchain network according to the endorsement policy, and transmits the transaction request to the target endorsement device that stores the signing key of the one or more target node devices.

3. The method according to claim 1, wherein each endorsement device in the management network stores the signing keys of all of the plurality of node devices in the blockchain network, and the acquiring a transaction request comprises:

receiving the transaction request transmitted by the management device, the transaction request being originated from a client, wherein upon receiving the transaction request transmitted by the client, the management device determines the target endorsement device that responds to the transaction request from each endorsement device according to current state parameters of each endorsement device, and transmits the transaction request to the target endorsement device.

4. The method according to claim 1, wherein the reference signature data is obtained by signing the transaction data using a private key in a key pair, and the validating the transaction data and the reference signature data comprises:

acquiring a public key in the key pair, and unsigning the reference signature data using the public key to obtain unsigned data;

detecting whether the transaction data has executability if the unsigned data matches the transaction data; and determining that the transaction data and the reference signature data are validated if the transaction data has the executability.

5. A data processing method based on a blockchain network, the blockchain network being in a data processing network, the blockchain network comprising a plurality of node devices, the data processing network further comprising a management network, the management network comprising a management device and a plurality of endorsement devices, the plurality of endorsement devices each storing signing keys of at least some of the plurality of node devices, and the method, implemented by the management device in the management network, comprising:

acquiring a transaction request, the transaction request carrying transaction data and reference signature data corresponding to the transaction data;

determining a target endorsement device from the plurality of endorsement devices in the management network based on the transaction request, an endorsement policy, and the signing keys stored at each of the plurality of endorsement devices;

transmitting the transaction request to the target endorsement device to cause the target endorsement device to validate the transaction data and the reference signature data, wherein the target endorsement device determines a matching node device from one or more target node devices in response to the transaction data and the reference signature data being validated, the matching node device corresponding to the target endorsement device, the target endorsement device acquires a signing key of the matching node device stored at the target endorsement device, the one or more target node devices being identified from the plurality of node devices in the blockchain network according to the endorsement policy, the target endorsement device determines data to be signed according to the transaction data, and the target endorsement device signs the data to be signed using the signing key of the matching node device to obtain endorsement signature data, and wherein to determine the data to be signed according to the transaction data, the target endorsement device simulates execution of a transaction to obtain a simulated transaction result based on the transaction data, determines a voting result corresponding to the transaction request according to the simulated transaction result, and takes the voting result as the data to be signed; and receiving the endorsement signature data transmitted by the target endorsement device, and generating, according to the endorsement signature data and the transaction data, a transaction block.

6. The method according to claim 5, wherein each endorsement device store the signing keys of different node devices respectively; the determining the target endorsement device from the plurality of endorsement devices in the management network comprises:

determining one or more target node devices from the plurality of node devices in the blockchain network according to the endorsement policy;

determining an endorsement device that stores the signing key of the one or more target node devices from each endorsement devices in the management network, and determining the endorsement device that stores the signing key of the one or more target node devices as the target endorsement device.

7. The method according to claim 5, wherein each endorsement device in the management network stores the signing keys of all of the plurality of node devices in the blockchain network, and the determining the target endorsement device from the plurality of endorsement devices in the management network comprises:

acquiring current state parameters of each endorsement device in the management network; and determining an endorsement device that responds to the transaction request from each endorsement device in the management network according to the current state parameters of each endorsement device, and determining the endorsement device that responds to the transaction request as the target endorsement device.

8. The method according to claim 5, further comprising:

broadcasting the transaction block to the node devices in the blockchain network such that the node device in the blockchain network executes a transaction according to the transaction data in response to determining that the data in the transaction block is validated and determining that the data in the transaction block satisfies the endorsement policy.

9. A non-transitory computer-readable storage medium, storing a computer program, the computer program, when run on a computer, causing the computer to perform a data processing method based on a blockchain network, the blockchain network being in a data processing network and comprising a plurality of node devices, the data processing network further comprising a management network, the management network comprising a management device and a plurality of endorsement devices, and the method, implemented by a target endorsement device of the plurality of endorsement devices in the management network, the target endorsement device being selected by the management device based on a transaction request, an endorsement policy, and the signing keys stored at each of the plurality of endorsement devices, comprising:

acquiring the transaction request from the management device, the transaction request carrying transaction data and reference signature data corresponding to the transaction data;

validating the transaction data and the reference signature data;

determining a matching node device from one or more target node devices in response to the transaction data and the reference signature data being validated, the matching node device corresponding to the target endorsement device, and acquiring a signing key of the matching node device stored at the target endorsement device, the one or more target node devices being identified from the plurality of node devices in the blockchain network according to the endorsement policy;

determining data to be signed according to the transaction data, and signing on the data to be signed using the signing key of the matching node device to obtain endorsement signature data; and transmitting the endorsement signature data to the management device, wherein the management device generates a transaction block according to the endorsement signature data and the transaction data, wherein the determining the data to be signed according to the transaction data comprises:

simulating execution of a transaction to obtain a simulated transaction result based on the transaction data; and determining a voting result corresponding to the transaction request according to the simulated transaction result, and taking the voting result as the data to be signed.

10. The computer-readable storage medium according to claim 9, wherein each endorsement device stores the signing keys of different node devices respectively; the acquiring the transaction request comprises:

receiving the transaction request transmitted by the management device, the transaction request being originated from a client, wherein upon receiving the transaction request transmitted by the client, the management device determines the one or more target node devices from the plurality of node devices in the blockchain network according to the endorsement policy, and transmits the transaction request to the target endorsement device that stores the signing key of the one or more target node devices.

11. The computer-readable storage medium according to claim 9, wherein each endorsement device in the management network stores the signing keys of all of the plurality of node devices in the blockchain network, and the acquiring a transaction request comprises:

receiving the transaction request transmitted by the management device, the transaction request being originated from a client, wherein upon receiving the transaction request transmitted by the client, the management device determines the target endorsement device that responds to the transaction request from each endorsement device according to current state parameters of each endorsement device, and transmits the transaction request to the target endorsement device.

12. The computer-readable storage medium according to claim 9, wherein the reference signature data is obtained by signing the transaction data using a private key in a key pair, and the validating the transaction data and the reference signature data comprises:

acquiring a public key in the key pair, and unsigning the reference signature data using the public key to obtain unsigned data;

detecting whether the transaction data has executability if the unsigned data matches the transaction data; and determining that the transaction data is validated over the reference signature data if the transaction data has the executability.

* * * * *